United States Patent [19]
Ishigami et al.

[11] 3,980,630
[45] Sept. 14, 1976

[54] METHOD FOR PREPARATION OF EMULSIFIER FOR EMULSION POLYMERIZATION

[75] Inventors: Masahisa Ishigami; Yoshikazu Inoue, both of Kakogawa, Japan

[73] Assignee: Harima Chemicals Inc., Kakogawa, Japan

[22] Filed: Apr. 30, 1975

[21] Appl. No.: 573,006

[30] Foreign Application Priority Data
Aug. 26, 1974 Japan.............................. 49-98177

[52] U.S. Cl.................................. 260/106; 252/356; 260/97; 260/97.5; 260/29.6 XA; 260/29.7 B; 526/216; 526/340
[51] Int. Cl.²........................................... C09F 1/00
[58] Field of Search..................... 260/106, 98, 97.5; 252/367, 356

[56] References Cited
UNITED STATES PATENTS

| | | | |
|---|---|---|---|
| 3,377,334 | 4/1968 | McBride | 260/98 |
| 3,649,612 | 3/1972 | Scharrer | 260/98 |
| 3,872,073 | 3/1975 | Thorpe | 260/106 |

*Primary Examiner*—Lewis T. Jacobs
*Assistant Examiner*—William E. Parker
*Attorney, Agent, or Firm*—Moonray Kojima

[57] ABSTRACT

Method of preparing an emulsifier useable in emulsion polymerization processes, comprising the steps of subjecting rosin, polyunsaturated fatty acid or mixture thereof to disproportionation reaction, in the presence of a catalyst of iron iodide, and then neutralizing with alkali, and use of such emulsifier in emulsion polymerization processes.

10 Claims, No Drawings

METHOD FOR PREPARATION OF EMULSIFIER FOR EMULSION POLYMERIZATION

BACKGROUND OF THE INVENTION

This invention relates to a method for preparation of emulsifier for use in emulsion polymerization, by disproportionation reaction of rosin, polyunsaturated fatty acid, or a mixture thereof. The emulsifier can be suitably adapted to prepare polymers such as synthetic rubber, synthetic resin and the like by emulsion polymerization of monomers such as butadiene, styrene, chloroprene, acrylonitrile, etc.

Generally, rosin contains various kinds of resin acids, such as abietic acid, palustric acid, levopimaric acid, neoabietic acid. The molecular structures of such acids include conjugated diene and hence these resin acids have high chemical activities. Consequently, it has been known that using alkalie salt of the rosin which contains the resin acids, as emulsifier for production of synthetic rubber, for example, has a disadvantage, to wit, inhibition of normal polymerization. Thus, when using rosin as an emulsifier for emulsion polymerization, it is necessary to convert the resin acid having conjugated diene structure to its derivative having no conjugated diene structure.

There are many processes in the prior art related to disproportionation reaction of rosin in the presence of a catalyst. For examples, in U.S. Pat. No. 2,177,530, a method is disclosed for disproportionation of rosin using palladium-active carbon as a catalyst. U.S. Pat. No. 2,617,792 discloses a method using nickel as a catalyst. U.S. Pat. Nos. 2,407,248; 2,409,173; 2,494,550; 2,497,882; and 2,503,238 disclose methods using sulfur as a catalyst. U.S. Pat. Nos. 2,311,386 and 2,503,268 disclose methods using iodine as a catalyst. U.S. Pat. No. 2,395,278 discloses a method using sulfur dioxide as a catalyst. Among the foregoing catalysts, the most often used is palladium-active carbon catalyst. However, disadvantageously, it is known that the palladium-active carbon catalyst is effective only during the initial reactionstage of the disproportionation of rosin, to promote smooth reaction as a catalyst. As the reaction progresses, the activity of the catalyst is reduced and is ultimately lost. As an added disadvantage, it is impossible to reactivate the palladium-active carbon catalyst once it is spent.

Another disadvantage of palladium-active carbon catalyst is that when used in disproportionation reaction of either Tall Oil rosin or Tall Oil, due to the existence of traces of sulfur therein, the catalytic activity of palladium-active carbon is substantially reduced. To eliminate this defect, it is necessary to pretreat the Tall Oil rosin or Tall Oil to remove the sulfur trace, prior to disproportionation reaction. If there is no pretreatment to remove the sulfur trace, the amount of palladium-active carbon catalyst required would be so great as to make the process uneconomical. On the other hand, the pretreatment also entails added costs. Thus, use of palladium-active carbon as a catalyst is not advantageous from an industrial scale viewpoint. For wood rosin or gum rosin, such catalyst may serve some useful purpose.

Use of nickel as a catalyst also has disadvantages. During the disproportionation reaction of rosin, a part of the nickel catalyst reacts with the rosin to produce a salt of resin acid, and the resultant salt of resin acid dissolves itself in the rosin. Thus, after the reaction is completed, it is necessary to remove the nickel salt of resin acid dissolved in rosin, hence, making this process uneconomical.

Use of either selene or sulfur dioxide as a catalyst produces objectionable odors, although advantageously, there is obtained a light colored resultant disproportionated rosin. Thus, this method is not preferred.

It is known that using iodine as catalyst in disproportionation of rosin, disadvantageously, produces a lower softening point.

Polyunsaturated fatty acid, such as linolic acid, linolenic acid, eleostearic acid, has more than two double bonds in each molecular structure, as does rosin. It has been known that using polyunsaturated fatty acid as an emulsifier for emulsion polymerization may retard the polymerization reaction and inhibit normal progress of ordinary polymerization. When using fatty acid as emulsion polymerization emulsifier, such fatty acid containing polyunsaturated fatty acid and mono-unsaturated fatty acid, should be subjected to hydrogenation reaction so that the reaction is conducted on the polyunsaturated fatty acid with the utmost extent and not on the mono-unsaturated fatty acid. Suitable mild reaction conditions should be selected to acquire acceptable emulsifiers.

SUMMARY OF THE INVENTION

An object of the invention is to eliminate the above-mentioned and other defects and disadvantages of the prior art.

The foregoing and other objects of the invention are attained in this invention which encompasses a method of preparing an emulsion polymerization emulsifier, comprising the steps of disproportionation reaction of rosin, polyunsaturated fatty acid or a mixture thereof, in the presence of 0.01 to 5 weight percent and preferably 0.1 to 1 weight percent, iron iodide and then neutralizing the obtained product with alkali such as KOH or NaOH. Advantageously, the resultant product has a high softening point and contains large amounts of dehydroabietic acid.

In accordance with the present invention, hydrogenation of fatty acid material containing polyunsaturated fatty acid, can be so conducted, in the presence of iron iodide as a catalyst, that both the saturated fatty acid and monounsaturated fatty acid contained therein do not take part in the disproportionation reaction. The reaction occurs only on the polyunsaturated fatty acid side, thus, producing partially polymerized fatty acid and mono-unsaturated fatty acid therefrom. It has been found that, advantageously, when using iron iodide as a catalyst, a mixture of saturated fatty acid and monounsaturated fatty acid containing a small amount of polyunsaturated fatty acid may be obtained from the resultant product of the above-mentioned disproportionation reaction by subjecting it to distillation treatment. Thus, using alkali salt of this mixture as an emulsifier for emulsion polymerization, does not cause any of the above discussed problems.

The emulsifier obtained by this process may be used in preparing polymers, such as styrene-butadiene rubber, by use of emulsion polymerization.

A feature of the invention is the use of iron iodide as a catalyst in the disproportionation reaction of rosin, polyunsaturated fatty acid or a mixture thereof.

Another feature of the invention is the use of 0.01 to 5 weight percent, and more preferably 0.1 to 1 weight percent, of iron iodide as the catalyst.

A further feature of the invention is the use of Tall Oil, Tall Oil Rosin or Tall Oil fatty acid in the disproportionation reaction with iron iodide as the catalyst.

Another feature of the invention is the use of the emulsifier obtained by the above method, in an emulsion polymerization process, such as for the production of, for example, styrene-butadiene rubber.

DETAILED DESCRIPTION OF PREFERRED EMBODIMENTS

In the present invention, the term "rosin" includes, for example, gum rosin, wood rosin and Tall Oil rosin. In accordance with the disproportionation method of the present invention an emulsifier useable in emulsion polymerization, and having superior properties may be obtained. When using Tall Oil rosin which contains a trace of sulfur, in contrast to use of palladium-active carbon or nickel as a catalyst as in the prior art, in accordance with the invention, the activity of the iron iodide catalyst does not decrease even though there are traces of sulfur present. Accordingly, advantageously, it is noted that the present invention enables use of Tall oil rosin material as an emulsifier after disproportionation reaction in the presence of iron iodide as a catalyst.

The method of the present invention can be applied effectively, for example, to the disproportionation of Tall Oil which is a mixture of rosin and unsaturated fatty acid, wherein the unsaturated fatty acid consists mainly of oleic acid and linoleic acid. That is to say, the disproportion reaction of Tall Oil in the presence of iron iodide as a catalyst, cause hydrogen atom transfer between resin acid and between resin acid and linolic acid. The rosin may be essentially dehydrogenated, while linolic acid may be mainly hydrogenated. The thus obtained disproportionation product has a preferrable composition of mono-unsaturated fatty acid and dehydroabietic acid.

In accordance with the method of the present invention, emulsion polymerization emulsifier of superior quality can be prepared from fatty acids, such as soybean oil fatty acid, rape seed oil fatty acid, cotton seed oil fatty acid, linseed oil fatty acid, Tall oil fatty acid, which contains, as main ingredient, polyunsaturated fatty acid, such as linolic acid, linolenic acid and the like, by subjecting said fatty acid to the above disproportionation reaction using iron iodide as a catalyst, and then neutralizing with an alkali. Any suitable alkali such as KOH or NaOH may be used. The term "polyunsaturated fatty acid" as used sometimes herein shall include those fatty acids having at least 50 weight percent or more of polyunsaturated fatty acids as above defined.

Accordingly to the invention, the amount of iron iodide used may range from 0.01 to 5 weight percent, and more preferably 0.1 to 1 weight percent, based on the weight of rosin, polyunsaturated fatty acid or combination thereof, used in the reaction phase.

The temperature of the disproportionation reaction may vary from 100° to 300°C, and more preferably between 150° to 250°C. The catalyst iron iodide may be fed into the disproportionation reaction system in the form of either solid or solution. In the latter case, a solvent, such as water or lower organic acids, which is inert to the disproportionation reaction.

To separate and remove iron iodide from the mixture produced by the disproportionation reaction, the mixture may be filtered after converting the iron iodide insoluble iron salt compound by adding inorganic acid such as hydrochloric acid, sulfuric acid, phosphoric acid, etc, to the resultant mixture, or the mixture may be distilled to produce a distillation residue of iron iodide.

Advantageously, the disproportionation product of the invention has a lower iodine value than its undisproportionation starting material; stability to oxydation is effective as an emulsion polymerization emulsifier and further more is particularly suitable as an emulsifier for styrene-butadiene rubber production.

The invention will now be further illustrated by actual examples, which are not to be construed in any limiting manner.

EXAMPLE 1

Into a flask, 300 g of Tall Oil rosin having acid value of 173.5 and softening point of 72°C and containing 3.9% fatty acid and 89.4% resin comprising 45.1% abietic acid and 17% dehydroabietic acid, were placed and heated up to 180°C under nitrogen gas stream and then 1.1 g of iron iodide (i.e. equivalent to 0.9 g iodine) was added thereto. The resultant mixture was heated up to 215°C to cause disproportionation reaction. After the temperature increased to 215°C, samples were taken out from the reaction phase at prescribed time intervals, and their contents of abietic acid and dehydroabietic acid were measured. The results are shown in Table 1. Table 2 shows the results of an analysis of the disproportionation products thus obtained. Comparison is made using 0.9 gram of iodine in place of iron iodide.

TABLE 1

| Reaction Time (min) | Iron Iodide (1.1g) | | Iodine (0.9g) | |
|---|---|---|---|---|
| | Abietic acid content (%) | Dehydro-abietic acid content (%) | Abietic acid content (%) | Dehydro-abietic acid content (%) |
| 0 | 45.1 | 17.0 | 45.1 | 17.0 |
| 5 | 17.1 | 34.8 | 19.3 | 24.6 |
| 10 | 11.6 | 39.0 | 16.4 | 24.5 |
| 30 | 4.7 | 42.8 | 10.8 | 26.1 |
| 60 | 1.4 | 46.5 | 7.5 | 26.2 |
| 120 | 0 | 47.2 | 4.3 | 27.1 |

TABLE 2

| Catalyst | iron iodide (1.1 g) | iodine (0.9 g) |
|---|---|---|
| Reaction temperature (°C) | 215 | 215 |
| Reaction time (min) | 120 | 120 |
| Acid value | 168.2 | 165.5 |
| Rosin acid content (%) | 85.3 | 81.2 |
| Fatty acid content (%) | 5.0 | 7.5 |
| Softening Point (°C) | 63 | 49 |

In connection with Table 1 and 2, the acid value was measured by the method of ASTM D465-51 and rosin acid content was measured by the modified Wolff Method of ASTM D803-55T. Fatty acid content was calculated by the following equation estimating mean acid value of rosin acid at 185.5 and of fatty acid at 200:

$$\text{fatty acid content (\%)} = \frac{\text{acid value} \times 100 - \text{rosin acid content (\%)} \times 185.5}{200}$$

Softening point was measured by ring and ballmethod.

After methylation of samples with diazomethane, contents of both abietic and dehydroabietic acid were measured to calculate integral ratio of the respective peaks obtained by gas chromatography.

According to Example 1, clear differences are shown between the results of both disproportionation reaction, i.e. in the presence of iron iodide as in our invention and in the presence of iodine as in the comparison example. The two amounts were equimolar. In the former case, abietic acid content was decreased and dehydroabietic acid was increased to greater extent than the latter case. Also, the resultant disproportionation product produced using iron iodide has a higher softening point than that produced using iodine.

EXAMPLE 2

Into a flask, 300 g of Tall Oil fatty acid containing 1.5% rosin, 42.3 % oleic acid and 35.3% linolic acid and having acid value of 192.2 and iodine value of 128 was added, and then 1.8 g of iron iodide was added thereto, as in the example 1. The resultant mixture thus obtained was heated up to 230° to 240°C and reacted for 2 hours. Then, the mixture was subjected to distillation under reduced pressure of 2.5 mm Hg, producing thereby 225 g of distillate fraction of boiling point 190° to 200°C. The distilled fatty acid thus obtained had acid value of 189.5 and iodine value of 89 and had shown octadenenoic acid content of 70.5% in which elaidic acid was contained, and linolic acid content of 1.2%, both measured as in Example 1 by gas chromatography.

EXAMPLE 3

Into a flask, 300 g of distillated Tall Oil containing 43.4% rosin comprising 21.5% abietic acid, and 51.1% fatty acid comprising 17.5% linolic acid; and 1.1 g of iron iodide were added. The resultant mixture was then heated up to 230°–240°C for 2 hours as in Example 1. The disproportionation product obtained had acid value of 177.6 and of which ingredients comprised 40.9% rosin containing none of abietic acid and 50.9% fatty acid containing 0.5% linolic acid.

EXAMPLE 4

Four emulsion polymerization experiments were conducted as follows: The same method and same treating conditions were used in all four cases, except four different kinds of emulsifiers were used. One was a conventionally marketed disproportionated rosin emulsifier. The other three were prepared by neutralization using an alkali, eg KOH or NaOH of products of disproportionated Tall Oil rosin, Tall Oil fatty acid, and Tall Oil of Examples 1,2 and 3.

Into a pressure vessel, 0.04 parts by weight of reducing agent Rongalit O (NaHSO$_2$.CHO.2H$_2$O + NaHSO$_3$.CH$_2$.2H$_2$O), 0.18 parts of trisodium methylene diaminetetraacetate, 0.015 parts of ferrous sulfate and 2.5 parts of the particular emulsifier were added. 0.2 parts sodium phosphate and 0.075 parts of naphthalene-sulfonic acid condensate were added thereto. 0.1 part dodecylmercaptane dissolved in 15 parts styrene were added. Then 35 parts of liquified butadiene was added and the pressure vessel was sealed and dipped into a thermostat kept at 5°C. After the contents of the vessel reached a satisfactory cold state, 0.08 part paramenthanehydroperoxide in styrene was added thereto. Polymerization reaction of the resultant mixture was carried out for six hours with continuous agitation. After sampling out from the resultant mixture product the sample was dried for 3 hours in a thermostat of 100°C and the residue obtained was weight. In this and other examples herein, the terms part and percent is in terms of weight part and weight percent. Polymerization rate was calculate as follows:

$$\text{Polymerization rate (\%)} = \frac{M \times \text{weight of residue (g)}}{\text{weight of sample (g)}} \times 100$$

wherein M is weight ratio between total material supplied to the reaction system and total polymerizable monomer supplied to the reaction system. In the above example, M was equal to 2.88. Thus, the emulsion polymerization experiments were conducted as above with the four emulsifiers. The results are shown below in Table 3.

TABLE 3

| Emulsifer | Polymerization rate (%) |
| --- | --- |
| Potassium salt emulsifer based on Example 1 | 73.2 |
| Potassium salt emulsifier based on Example 2 | 80.4 |
| Potassium salt emulsifier based on Example 3 | 70.8 |
| Conventional Emulsifier | 71.8 |

As is obvious through study of Table 3, emulsifiers obtained by the method of the present invention was at least as satisfactory as and more so than conventional emulsifiers for emulsion polymerization, in so far as the effect on polymerization rate is concerned. In other respects, the invention is superior.

The foregoing description is illustrative of the principles of the invention. Numerous other variations and modifications thereof would be apparent to the worker skilled in the art. All such variations and modifications are to be considered to be within the spirit and scope of the invention.

What is claimed is:

1. Method of preparing an emulsifier, comprising the steps of disproportionation reacting rosin, polyunsaturated fatty acid, or mixture thereof, in the presence of a catalyst of 0.01 to 5 weight percent iron iodide, and neutralizing the resulting product with alkali.

2. The method of claim 1, wherein said disproportionation reacting is at 100° to 300°C.

3. The method of claim 2, wherein said temperature is 150° to 250°C, and wherein said iron iodide is used in an amount of 0.1 to 1 weight percent.

4. The method of claim 1, wherein said iron iodide is in solid form, or in solution with water or lower organic acid as solvent.

5. The method of claim 1, wherein said polyunsaturated fatty acid is selected from the group consisting of soybean oil, rape seed oil, cotton seed oil, linseed oil, and Tall oil.

6. An emulsifier produced by disproportionation reaction of claim 1.

7. Process of emulsion polymerization of monomers in presence of an emulsifier obtained by disproportionation reaction of rosin, polyunsaturated fatty acid or mixtures thereof, in the presence of a catalyst iron iodide, and neutralized with alkali.

8. Process of claim 7, wherein said monomers are styrene and butadiene and the polymer produced thereby is styrene-butadiene rubber.

9. Process of claim 1, wherein said alkali is KOH or NaOH.

10. An emulsifier produced by disproportionation reaction of claim 1 for use in production of synthetic rubber.

* * * * *